Nov. 18, 1941.   H. C. TIFFT   2,263,318
INTERNAL COMBUSTION ENGINE
Filed Sept. 1, 1937
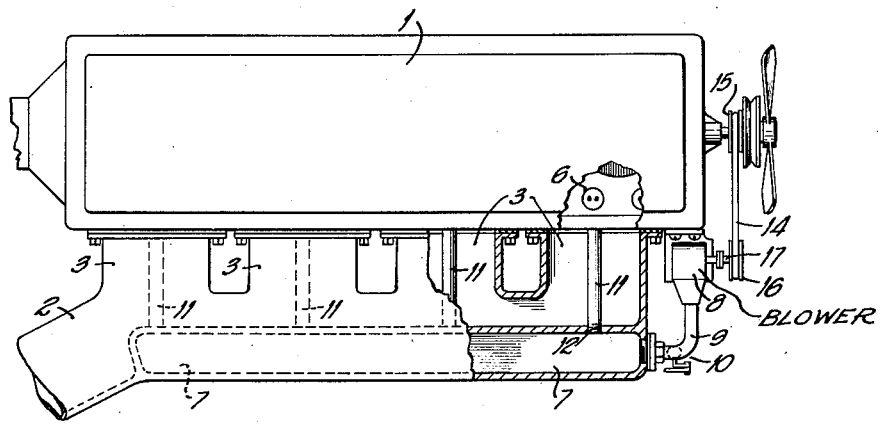
FIG.1
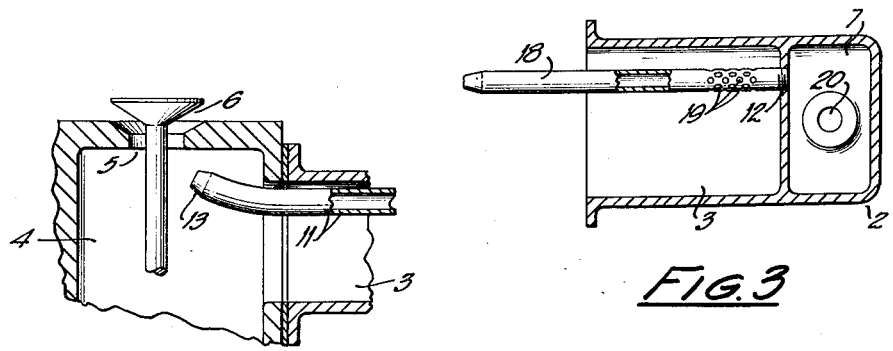
FIG.2
FIG.3
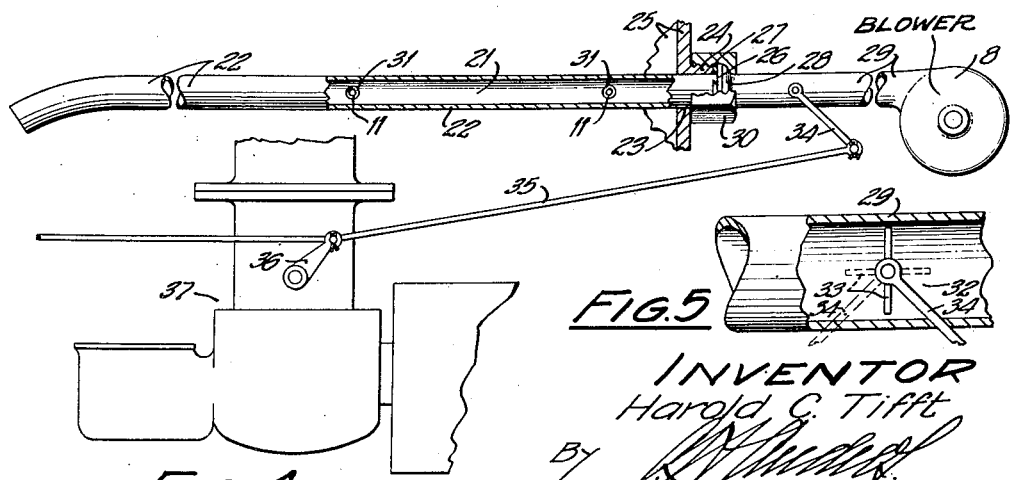
FIG.5
FIG.4
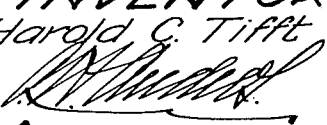
INVENTOR
Harold C. Tifft
BY
ATTORNEY Patented Nov. 18, 1941

2,263,318

UNITED STATES PATENT OFFICE 2,263,318

INTERNAL COMBUSTION ENGINE

Harold C. Tifft, Albany, N. Y.

Application September 1, 1937, Serial No. 161,945

2 Claims. (Cl. 60—30)

My invention particularly relates to improvements in internal combustion engines for reducing and substantially eliminating the carbon monoxide content in the exhaust gases discharged therefrom.

Oxidizing fluids such as air have in the past been introduced in the exhaust manifolds of internal combustion engines in an attempt to support combustion of the hydrocarbon fuel to completion. The reason for the marked superiority in the results attained in the practice of my present invention over devices previously employed for CO conversion purposes is, in brief, due principally to the failure in former devices properly to control the introducion of air or other combustion-supporting media, first, in correct and variable amounts, secondly, in its zone of discharge and, third, in its temperature.

I have determined that all three of these factors must be considered in designing a carbon monoxide convertor which will function with excellent results under all normal operating conditions of internal combustion engines and my invention contemplates the method and means, hereinafter particularly pointed out, for effecting CO conversion to $CO_2$ in accordance with the dictates of these factors.

When the products of combustion are discharged through the exhaust port or valve of an engine, they expand rapidly into the exhaust manifold with a very rapid temperature drop. The drop is such that at only a short distance from the exhaust valve, the exhaust gas temperature is insufficient to support further combustion upon the introduction of air thereto to convert the carbon monoxide. It is, therefore, a first object of my invention to provide means for introducing air to the exhaust gases of an internal combustion engine in a zone immediately adjacent the exhaust valve, in which zone the temperature of the exhaust gas is sufficiently high to support further combustion even though air at ambient temperatures is introduced thereto.

In conjunction with the foregoing, it should be noted that the introduction of air at ambient temperatures also lowers the exhaust gas temperature thereby effecting a still further departure from conditions favorable to CO conversion. A further object of my invention, therefore, resides in providing means for introducing air to the exhaust gases and arranging said means whereby said air is preheated before introduction to the gas stream.

A still further object resides in the provision of means for controlling the flow of air to the exhaust gases and varying the quantity of air supplied subtantially in accordance with variations in speed of the engine.

With these and other objects in view, my invention includes the method, herein pointed out, and the novel elements and the combinations and arrangements thereof described below and illustrated in the accompanying drawing in which—

Fig. 1 is a fragmentary plan view of an internal combustion engine, with parts broken away, illustrating my invention associated therewith;

Fig. 2 is a fragmentary, sectional view through an engine block and exhaust manifold illustrating the preferred, relative disposition of the exhaust valve and air supply conduit;

Fig. 3 illustrates a modified form of air conduit;

Fig. 4 is a somewhat schematic illustration of a form of air supply conduit illustrating one manner of controlling the flow of air therethrough; and Fig. 5 is a fragmentary, sectional view of a portion of the air conduit showing a control valve therein.

Although in the following description and appended claims I refer to air as the oxidizing media, it is to be understood and construed as inclusive of any fluid capable of supporting combustion.

Referring first to Fig. 1, 1 represents an internal combustion engine to which is secured an exhaust manifold 2 including lateral passages 3 which are mounted in registry with exhaust chambers, shown at 4 in Fig. 2, in the engine block. After explosion in the cylinder, the gases are discharged through the exhaust port 5, controlled by exhaust valve 6, the gases passing downwardly into chamber 4 and thence outwardly through the exhaust manifold.

In the embodiment of my invention illustrated in Fig. 1, the exhaust manifold 2 has formed therein an air chamber 7 for heating air passing therethrough. To chamber 7 is connected a blower or compressor 8 by means of pipe 9. A valve, indicated generally at 10 and which may be of the butterfly type, is preferably incorporated in pipe 9 to control the air flow from the blower 8, as hereinafter described.

The air conduit of Fig. 1 for supplying air to the exhaust gases comprises the pipe 9, chamber 7 and tubular elements or tubes 11 which may be supported in the interior wall of chamber 7, as by pipe threads 12, to project therefrom and extend through the lateral passages 3 of the exhaust manifold. The tubes 11 are preferably tapered as at 13 at their discharge ends to form slightly restricted orifices which may be directed upwardly as shown in Fig. 2 to some extent whereby the air is projected into the exhaust gases as they stream through the exhaust port 5. Furthermore the tubes 11 are preferably disposed to discharge in a direction most favorable for effecting thorough intermixture of air and exhaust gases. A disposition of the orifices thereof in a direction opposite to that of flow of the exhaust gases has proven very satisfactory.

The blower 8 which may be driven in any suitable manner is herein illustrated as driven through the medium of a belt 14 reeved over a pulley 15 on the fan shaft of the engine and a pulley 16 on the drive shaft 17 of the blower.

In operation, blower 8 supplies air under pressure, the flow of which is preferably controlled by valve 10 in a manner hereinafter pointed out, to the chamber 7 wherein it is heated by the exhaust gases of the engine. The preheated air is then delivered through the respective tubes 11 to zones immediately adjacent the exhaust valves. By this method, preheated air is supplied to the exhaust gases before an appreciable expansion and drop in the temperature thereof has occurred whereby attenuated combustion is exercised under most favorable conditions.

Secondary air admission or introduction of additional air to the exhaust gases in a zone more remote from the exhaust valve and cylinder than the zone above pointed out is accomplished by employing an air tube of the character illustrated in Fig. 3. For this purpose, the tube 18 is provided intermediate the length thereof with an opening or multiplicity of foraminations 19. Air admitted through the inlet opening 20 to chamber 7 is discharged from tube 18 into the exhaust gases in two zones, the first, immediately adjacent the exhaust valve, and the second, more remote therefrom and at a point where it may promote further carbon monoxide conversion in the flow of gases through the exhaust manifold.

In the somewhat schematic illustration of one manner in which the air supplied to the exhaust gases may be controlled, I have shown a modified form of air-preheating chamber which may be inserted within and secured to the usual exhaust manifold. The chamber 21 is formed by a tubular element 22 of an external diameter sufficient closely to fit within an opening 23 in an externally threaded boss 24 formed on the exterior of the head or forward wall of an exhaust manifold 25. The end of element 22 is provided with a flange 26 and a gasket 27 may be interposed between the face of boss 24 and said flange. The flared end 28 of a connecting pipe 29, adapted to communicate with the blower 8 and chamber 21, is designed to abut the flanged end of element 22 and a nut 30 engaging the threaded boss serves to connect pipe 29 with tubular element 22 and secure element 22 to the manifold 25.

Element 22 is also drilled and tapped at suitable spaced intervals, designated at 31, to receive the tubes 11. In assembling, the tubular element 22 is first secured in place within the exhaust manifold and thereafter tubes 11 are passed through the lateral passages thereof, as passages 3 in Fig. 1, and screwed into the openings 31.

Connecting pipe 29 has disposed therein a valve 32, clearly illustrated in Fig. 5, comprising a rotatably mounted vane or disc 33 and an arm 34, which is connected by link 35 to the control arm 36 of a carburetor 37. The connection of link 35 to a carburetor control arm is shown only for exemplary purposes as a desirable manner in which properly to control the air flow to chamber 21.

A valve of the foregoing character serves to control the flow of air, delivered from the blower 8, to the pipes 11. Although the speed of rotation of the impeller of blower 8 varies with engine speeds, the quantity of air supplied thereby, without any control, will not be in correct amounts for efficient CO conversion at engine idling speeds and also at high speeds. In other words, the quantity of air delivered by the blower, alone, does not vary with varying engine speeds over a sufficiently wide range, and, the blower, if of a capacity to meet requirements at high engine speeds will supply too much air at low engine speeds. Therefore, a blower, such as blower 8, is employed which will supply sufficient air to the tubes 11 to effect efficient CO conversion at high engine speeds and valve 32, actuated when the control arm of the carburetor is actuated, will lie in open position permitting maximum air flow to the tubes 11 under these conditions. However, when the engine speed is reduced to idling speeds, the valve 32 will permit only relatively small but substantially correct amounts of air to be delivered to the tubes 11, appreciably less than the amounts which would be supplied by the blower in the absence of this valve. It is not necessary to provide for an actuation of valve 32 for every change in engine speeds and a connection may be employed permitting movement to some extent of arm 36 relative to arm 34.

It will be understood that valve 10 of Fig. 1 is designed to be controlled as above explained in connection with valve 32 and that in the preferred arrangement of my invention such an air flow control is incorporated because proper control of air prevents the introduction of air in excessive amounts to the exhaust gases.

It will be further understood that by introducing the air to the exhaust gases in a zone immediately adjacent the exhaust valve the high efficiency of my device is preserved even at idling speeds of the engine.

The tubes 11 may be formed of an oxidizable metal such as copper in order that advantage may be taken of the catalytic effect of the oxide formed on the surface thereof.

While I have described my invention in its preferred embodiments, it is to be understood that the words which I have used are words of description rather than of limitation and that changes may be made within the purview of the appended claims without departing from the true scope and spirit of my invention in its broader aspects.

What I claim is:

1. In an internal combustion engine comprising a cylinder, an exhaust port and exhaust valve and an exhaust gas manifold, an air conduit extending within said manifold and adapted to permit air to flow therethrough when air is supplied thereto, said conduit being disposed with its discharge end in close proximity to said valve and arranged to discharge air toward said port and in a direction opposite to the direction of flow of exhaust gases issuing therefrom, and said conduit being provided with an opening intermediate the length thereof affording communication between the interior of said conduit and manifold, and means for supplying air under pressure to said conduit while said exhaust valve is open.

2. In an internal combustion engine comprising a cylinder, an exhaust port and exhaust valve, and an exhaust passage communicating with said port for the flow of exhaust gases therethrough, a tubular element projecting within said passage and adapted to permit air to flow therethrough when air is supplied thereto, the discharge end of said element being disposed in close proximity to said valve and arranged to discharge air toward said port and in a direction opposite to the direction of flow of exhaust gases but the discharge end of said element being arranged in spaced relation to the defining walls of said exhaust passage whereby exhaust gases may pass in a substantially unrestricted flow on all sides of said tubular element and air from said element will be discharged substantially in a central zone of the stream of exhaust gases and intermix in combustion-supporting association therewith, means for supplying air under pressure to said tubular element while said exhaust valve is open, and means for varying the quantity of air supplied through said tubular element.

HAROLD C. TIFFT.